(12) United States Patent
Jean et al.

(10) Patent No.: US 9,058,261 B1
(45) Date of Patent: *Jun. 16, 2015

(54) SYSTEMS AND METHODS FOR DETAILED ERROR REPORTING IN DATA STORAGE SYSTEMS (71) Applicant: WESTERN DIGITAL TECHNOLOGIES, INC., Irvine, CA (US)

(72) Inventors: Sebastien A. Jean, Irvine, CA (US); Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,770

(22) Filed: Feb. 20, 2014

Related U.S. Application Data (63) Continuation of application No. 13/226,418, filed on Sep. 6, 2011, now Pat. No. 8,713,357.

(51) Int. Cl.
*G06F 11/07* (2006.01)

(52) U.S. Cl.
CPC ........ *G06F 11/0769* (2013.01); *G06F 11/0766* (2013.01)

(58) Field of Classification Search
CPC .................................................. G06F 11/0766
USPC .................................................. 714/6.1, 6.11
See application file for complete search history.

(56) References Cited

U.S. PATENT DOCUMENTS

| 6,148,354 | A | 11/2000 | Ban et al. |
| 6,182,248 | B1 | 1/2001 | Armstrong et al. |
| 6,304,984 | B1 | 10/2001 | Neal et al. |
| 6,519,718 | B1 | 2/2003 | Graham et al. |
| 6,735,661 | B2 | 5/2004 | Gelke et al. |
| 6,785,767 | B2 | 8/2004 | Coulson |
| 6,856,556 | B1 | 2/2005 | Hajeck |
| 6,988,175 | B2 * | 1/2006 | Lasser ........................... 711/156 |

(Continued)

FOREIGN PATENT DOCUMENTS

WO 2011019596 A2 2/2011

OTHER PUBLICATIONS

Office Action dated Mar. 29, 2013 U.S. Appl. No. 13/297,082, 14 pages.
Office Action dated Oct. 25, 2013 from U.S. Appl. No. 13/297,082, 38 pages.
Office Action dated Oct. 23, 2013 from U.S. Appl. No. 13/297,163, 34 pages.

(Continued)

*Primary Examiner* — Chae Ko (57) ABSTRACT

Embodiments of the invention are directed to providing detailed error reporting of data operations performed on a NVM storage device. In one embodiment, a controller interfaces with a NVM storage device including NVM storage coupled with a bridge. In one embodiment, the controller is provided physical, page-level access to the NVM via the bridge, and the bridge provides detailed error reporting of the data operations that the bridge performs on the NVM on behalf of the controller. For example, the bridge may provide page level reporting indicating which page(s) failed during a read operation. Detailed error reporting allows the controller to better understand the failures that occurred in a data access operation in the NVM. It also enables the controller to manage the flash media at the physical page/block level. In one embodiment, detailed error reporting also enables the return of discontinuous ranges of data with the error portions removed.

22 Claims, 7 Drawing Sheets

(56) References Cited

U.S. PATENT DOCUMENTS

| | | |
|---|---|---|
| 7,103,684 B2 | 9/2006 | Chen et al. |
| 7,126,857 B2 | 10/2006 | Hajeck |
| 7,127,549 B2 | 10/2006 | Sinclair |
| 7,136,973 B2 | 11/2006 | Sinclair |
| 7,430,136 B2 | 9/2008 | Merry, Jr. et al. |
| 7,447,807 B1 | 11/2008 | Merry et al. |
| 7,460,394 B2 | 12/2008 | Happ et al. |
| 7,502,256 B2 | 3/2009 | Merry, Jr. et al. |
| 7,509,441 B1 | 3/2009 | Merry et al. |
| 7,594,135 B2 | 9/2009 | Gonzalez et al. |
| 7,596,643 B2 | 9/2009 | Merry, Jr. et al. |
| 7,623,401 B2 | 11/2009 | Philipp et al. |
| 7,631,245 B2 | 12/2009 | Lasser |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,716,411 B2 | 5/2010 | Panabaker et al. |
| 7,733,712 B1 | 6/2010 | Walston et al. |
| 7,765,373 B1 | 7/2010 | Merry et al. |
| 7,861,038 B2 | 12/2010 | Fontenot et al. |
| 7,861,122 B2 | 12/2010 | Cornwell et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,957,173 B2 | 6/2011 | Kim |
| 7,962,777 B2 | 6/2011 | Gonzalez et al. |
| 7,962,792 B2 | 6/2011 | Diggs et al. |
| 7,970,978 B2 | 6/2011 | Luo et al. |
| 8,065,304 B2 | 11/2011 | Ross |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,120,969 B1 | 2/2012 | Montierth et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,291,295 B2 | 10/2012 | Harari et al. |
| 8,296,625 B2 | 10/2012 | Diggs et al. |
| 8,312,207 B2 | 11/2012 | Merry, Jr. et al. |
| 8,315,092 B2 | 11/2012 | Strasser et al. |
| 8,316,176 B1 | 11/2012 | Phan et al. |
| 8,341,339 B1 | 12/2012 | Boyle et al. |
| 8,341,374 B2 | 12/2012 | Kwon et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,443,263 B2 | 5/2013 | Selinger et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2002/0053010 A1 | 5/2002 | Piccirillo et al. |
| 2003/0165076 A1 | 9/2003 | Gorobets et al. |
| 2003/0172261 A1 | 9/2003 | Lee et al. |
| 2005/0160217 A1 | 7/2005 | Gonzalez et al. |
| 2005/0223373 A1 | 10/2005 | Gage et al. |
| 2005/0251617 A1 | 11/2005 | Sinclair et al. |
| 2006/0248387 A1 | 11/2006 | Nicholson et al. |
| 2007/0038901 A1* | 2/2007 | Shiota et al. ............. 714/54 |
| 2007/0180328 A1 | 8/2007 | Cornwell et al. |
| 2007/0190328 A1 | 8/2007 | Cowburn et al. |
| 2007/0220202 A1 | 9/2007 | Sutardja et al. |
| 2007/0245092 A1 | 10/2007 | Yeh |
| 2007/0288683 A1 | 12/2007 | Panabaker et al. |
| 2007/0288692 A1 | 12/2007 | Bruce et al. |
| 2008/0040531 A1* | 2/2008 | Anderson ............. 710/313 |
| 2008/0192928 A1* | 8/2008 | Yu et al. ............. 380/44 |
| 2008/0215808 A1 | 9/2008 | Ashmore et al. |
| 2008/0250270 A1* | 10/2008 | Bennett ............. 714/6 |
| 2009/0013233 A1* | 1/2009 | Radke ............. 714/752 |
| 2009/0024793 A1 | 1/2009 | Fontenot et al. |
| 2009/0037652 A1 | 2/2009 | Yu et al. |
| 2009/0063730 A1 | 3/2009 | Gower et al. |
| 2009/0158124 A1* | 6/2009 | Kawai et al. ............. 714/763 |
| 2009/0172257 A1 | 7/2009 | Prins et al. |
| 2009/0240873 A1 | 9/2009 | Yu et al. |
| 2009/0282305 A1* | 11/2009 | Chen et al. ............. 714/718 |
| 2009/0313411 A1 | 12/2009 | Stenfort |
| 2010/0023800 A1* | 1/2010 | Harari et al. ............. 714/2 |
| 2010/0037012 A1 | 2/2010 | Yano et al. |
| 2010/0088459 A1 | 4/2010 | Arya et al. |
| 2010/0100675 A1 | 4/2010 | Furuhjelm |
| 2010/0122022 A1* | 5/2010 | Luo et al. ............. 711/103 |
| 2010/0174849 A1 | 7/2010 | Walston et al. |
| 2010/0174851 A1 | 7/2010 | Leibowitz et al. |
| 2010/0180182 A1* | 7/2010 | Trantham ............. 714/799 |
| 2010/0205517 A1* | 8/2010 | Lee et al. ............. 714/807 |
| 2010/0217924 A1 | 8/2010 | Panabaker et al. |
| 2010/0250793 A1 | 9/2010 | Syu |
| 2010/0268874 A1 | 10/2010 | Pyeon |
| 2010/0281342 A1* | 11/2010 | Chang et al. ............. 714/773 |
| 2010/0325352 A1 | 12/2010 | Schuette et al. |
| 2010/0327923 A1 | 12/2010 | Pyeon et al. |
| 2011/0010491 A1* | 1/2011 | Anderson ............. 711/103 |
| 2011/0035540 A1 | 2/2011 | Fitzgerald et al. |
| 2011/0040924 A1* | 2/2011 | Selinger ............. 711/103 |
| 2011/0041039 A1 | 2/2011 | Harari et al. |
| 2011/0082985 A1 | 4/2011 | Haines et al. |
| 2011/0099323 A1 | 4/2011 | Syu |
| 2011/0107076 A1 | 5/2011 | Kim et al. |
| 2011/0119442 A1 | 5/2011 | Haines et al. |
| 2011/0138112 A1 | 6/2011 | Chiang et al. |
| 2011/0145489 A1 | 6/2011 | Yu et al. |
| 2011/0238885 A1 | 9/2011 | Kitahara et al. |
| 2011/0283049 A1 | 11/2011 | Kang et al. |
| 2011/0283135 A1* | 11/2011 | Burger et al. ............. 714/6.1 |
| 2011/0289267 A1 | 11/2011 | Flynn et al. |
| 2011/0320915 A1 | 12/2011 | Khan |
| 2012/0102263 A1* | 4/2012 | Aswadhati ............. 711/103 |
| 2012/0131268 A1* | 5/2012 | Anderson ............. 711/103 |

(56) References Cited

U.S. PATENT DOCUMENTS

| | | |
|---|---|---|
| 2012/0203951 A1* | 8/2012 | Wood et al. .................. 711/102 |
| 2012/0221922 A1* | 8/2012 | Bennett ........................ 714/758 |
| 2012/0233380 A1 | 9/2012 | Butterfield |
| 2012/0260020 A1 | 10/2012 | Suryabudi et al. |
| 2012/0265926 A1* | 10/2012 | Tal et al. ...................... 711/103 |
| 2012/0278531 A1 | 11/2012 | Horn |
| 2012/0284460 A1 | 11/2012 | Guda |
| 2012/0324191 A1 | 12/2012 | Strange et al. |
| 2013/0060981 A1 | 3/2013 | Horn et al. |
| 2013/0073785 A1 | 3/2013 | Emma et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Interview Summary dated Jan. 27, 2014 from U.S. Appl. No. 13/297,163, 3 pages.
Interview Summary dated Jan. 28, 2014 from U.S. Appl. No. 13/297,082, 3 pages.
Office Action dated Oct. 29, 2013 U.S. Patent No. 8,700,834, 28 pages.
Office Action dated Jul. 31, 2013 from U.S. Appl. No. 13/297,089, 15 pages.
Notice of Allowance dated Dec. 23, 2013 from U.S. Appl. No. 13/297,089, 6 pages.
Interview Summary dated Oct. 29, 2013 from U.S. Appl. No. 13/297,089, 3 pages.
Notice of Allowance dated Jan. 27, 2014 from U.S. Appl. No. 13/226,418, 9 pages.
Office Action dated Oct. 1, 2013 from U.S. Appl. No. 13/226,418, 14 pages.
Interview Summary dated Jan. 6, 2014 from U.S. Appl. No. 13/226,418, 3 pages.

* cited by examiner

SYSTEMS AND METHODS FOR DETAILED ERROR REPORTING IN DATA STORAGE SYSTEMS

CROSS REFERENCE TO RELATED APPLICATION

This application is a continuation of U.S. patent application Ser. No. 13/226,418, filed on Sep. 6, 2011, which is hereby incorporated by reference in its entirety.

BACKGROUND

1. Technical Field

This disclosure relates to non-volatile storage systems, including but not limited to flash drives. More particularly, the disclosure relates to systems and methods for detailed error reporting in solid state drives.

2. Description of the Related Art

Error reporting in data storage devices do not typically provide much detail at the physical level of the individual storage elements (e.g., pages). Once a failure is encountered in an operation, most existing I/O protocols report a failure of the overall operation (e.g., a read operation) and abort the operation at that first encountered point of failure. For example, in hard disk drives (HDD), the error reporting may report that a read failed at sector X, the first point of failure, but may provide no additional information about any errors that may have been encountered elsewhere in the read. Similarly, in many solid state drives (SSD) the controller typically do not receive any detailed error reporting.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

I. SYSTEM OVERVIEW

Error reporting in common high-level protocols typically reports only the first encountered point of failure. For example, in HDD, the error reporting may report that a read failed at sector X, the first point of failure, but may provide no additional information about any errors that may have been encountered elsewhere in the read. With respect to flash media in SSDs, the commonly used ONFI (Open NAND interface) may provide page level error information but the information is not user-friendly. ONFI also has limited ability to perform queued operation. It has the active operation and the next/"cached" operation. Based on this arrangement it may be possible to detect which of the two operations failed, though involvement from a controller may be necessary. For example, current implementations of ONFI provide a status per operation and the controller may need to retrieve such status after each operation to determine whether an error has occurred. However, the situation becomes more complicated when there are multiple ONFI devices (dies) involved (e.g., 8 or more), each with two planes and cached operations that are all accessed concurrently.

Embodiments of the invention are directed to providing detailed error reporting of data operations performed on a NVM storage device. In one embodiment, a controller interfaces with a NVM storage device including NVM storage coupled with a bridge. In one embodiment, the controller is provided physical, page-level access to the NVM via the bridge, and the bridge provides detailed error reporting of the data operations that the bridge performs on the NVM on behalf of the controller. For example, the bridge may provide page level reporting indicating which page(s) failed during a read operation. Detailed error reporting allows the controller to better understand the failures that occurred in a data access operation in the NVM. It also enables the controller to manage the flash media at the physical page/block level and provides the controller an efficient way to discover errors since the controller does not need to locate individual errors with repeated failed operations.

In addition, many common implementations operate on an all-or-nothing model, which means that an error typically results in no data being returned on a read. In one embodiment, detailed error reporting also enables the return of discontinuous ranges of data with the error portions removed. This provides a different way of handling errors as many common protocols report only the first error encountered only and do not return valid data around the errors. In implementations using those common protocols, the host (or controller), upon receipt of the error report, would need to investigate the media around the reported problem area to find additional problems. Given that failures often cluster, this is not very efficient. In contrast, the embodiments described in this disclosure report some or all of the errors detected, not just the first error. This provides a more complete picture by capturing the failure clusters and helps the controller make better decisions in media management. In addition, because detailed error reports are provided by the bridge, the controller is in a position to track such errors and take preventative measures such as moving data and/or increasing data redundancy in response to increased errors.

Figure 1A:
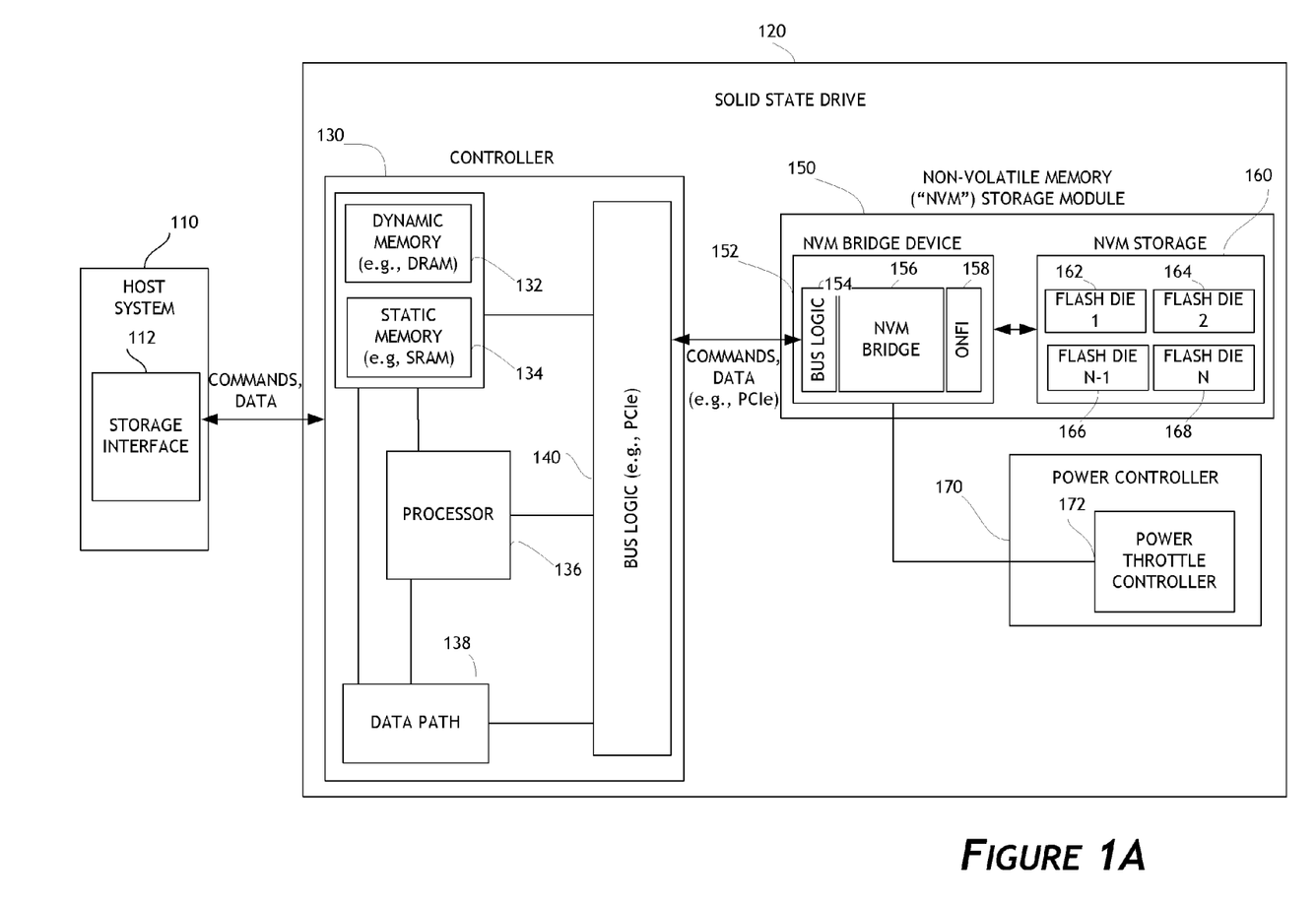
FIGS. 1A and 1B are block diagrams showing the controller architecture according to some embodiments.

FIG. 1A shows a controller-bridge architecture in accordance with some embodiments. This is one example architecture in which the detailed error reporting mechanisms can be implemented. Those skilled in the art will recognize that other equivalent or similar setups can be used. For example, while the description below discusses standardized interfaces such as PCIe and ONFI, other similar standardized and/or proprietary interfaces can be used and/be adapted for this purpose. Also, while the example architecture below includes details related to various portions to the architecture, they should not be construed as being required and may be omitted in some embodiments. For example, in some embodiments the detailed error reporting mechanisms may be implemented without the various queuing mechanisms described below.

As shown, a solid-state non-volatile storage system 120 is connected to a host system 110. The host system 110 communicates with the non-volatile storage system 120 using a storage interface 112. The host's storage interface 112 can communicate with the non-volatile storage system 120 using any known communication protocol, such as SATA, SCSI, SAS, USB, Fibre Channel, PCIe, eMMC, etc.

In one embodiment, the non-volatile storage system 120 includes a controller 130 and a NVM storage module 150. The controller 130 in one embodiment communicates with a bridge device 152 within the NVM storage module 150 via a high level interface such as PCIe (through bus logic/interface 140). PCIe is used in one embodiment as it defines a rich packet based routing and Quality of Service (QoS) infrastructure and provides a high speed interface. The controller may include a processor 136 to control data functions, and the core may be coupled with static memory 132 and dynamic memory 134. The controller 130 may also include a data path 138 for processing/transferring data related to data access commands from the host system 110. In one embodiment, the controller 130 is implemented on a SoC (System on Chip), though those skilled in the art will recognize that other hardware/firmware implementations are possible.

In one embodiment, the use of PCIe means that the address range assigned to a device function is used for packet routing both on the fabric and within the device. In one embodiment, the PCIe transaction layer delivers packets to an internal register interface that is read by firmware. Advanced devices often direct incoming packets to internal RAM or hardware acceleration modules.

The bridge device 152 in one embodiment comprises bus logic/interface 154 for communicating with the bus logic/interface 140 (on the controller 130) over the high level interface bus. On the other end of the bridge, the bridge device 152 includes a low level interface 158 such as ONFI for communicating with the NVM storage 160 (e.g., NAND), which may include a number of storage devices such as flash dies 162, 164, 166, and 168. Although ONFI is depicted in this embodiment, other suitable flash memory interfaces may be used. In another embodiment, the bridge may use a different interface such as Toggle or a proprietary interface to communicate with the NVM storage 160, or send direct commands to the storage.

I.A. Division of Labor

The advantages of dividing the NVM management functions were outlined above in Section I. In particular, the architecture reduces latency and addresses the various design constraints while allowing the controller and bridge designers to optimize their respective portions of the architecture. In one embodiment, the controller is responsible for block level management, parity stripe layout, garbage collection, wear leveling, handling read disturb and error recovery. The bridge device, in one embodiment, manages the raw NVM flash interface. It may also provide one or more of: command queuing, error correction, XOR parity accumulator, data protection and enhances block endurance. The interface between the bridge and the controller in one embodiment is a lightweight PCIe-based data and management interface. The controller uses the interface control command to configure the bridge and data commands to access the NVM media.

It is also noted that the controller uses physical page addressing instead of a logical one that is common in existing controller-bridge design. The bridge can identify the relationship between pages, blocks, planes, and dies. This gives the controller the greatest flexibility for creating RAID stripe layout, performing data moves, and handling bad blocks. These details are abstracted from the bridge. When using direct addressing, the controller simply provides a set of direct page addresses in the command header to the bridge. In one embodiment, the pages are not necessarily sequential or even in the same block. In most cases, the controller will access pages spread across multiple planes and multiple dies in order to maximize concurrent hardware access. Additional details related to the above described controller architecture can be found in application Ser. No. 13/226,393, entitled "SYSTEMS AND METHODS FOR AN ENHANCED CONTROLLER ARCHITECTURE IN DATA STORAGE SYSTEMS," filed Sep. 6, 2011 and issued as U.S. Pat. No. 8,700,834, the disclosure of which is hereby incorporated by reference.

I.B. Hybrid Application

Figure 1B:
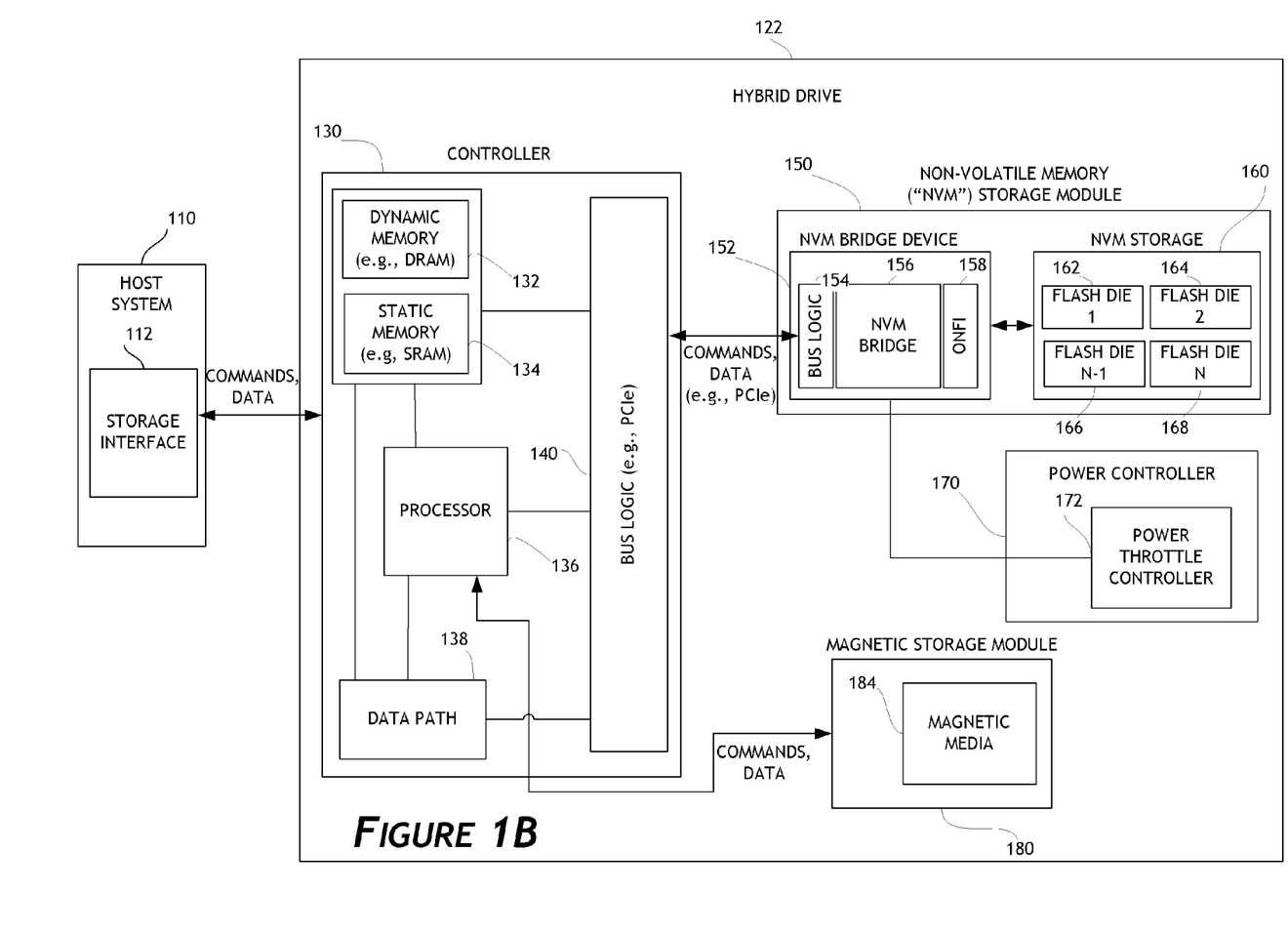

Some embodiments of the controller-bridge architecture can be adapted for other uses. For example, FIG. 1B shows the use of the controller architecture in a hybrid drive 122, which in addition to the NVM and bridge components described above, includes a magnetic storage module 180 which has a magnetic media 184 such as a rotating hard disk drive (HDD). The controller 130 in this embodiment would thus manage data accesses to both the NVM storage module 150 and magnetic storage module 180. In one embodiment, a different interface than interface 140 (which connects to the NVM) may be used to connect the controller 130 to the magnetic storage module 180.

The hybrid application illustrates an additional advantage of the controller architecture. A hybrid drive typically includes an SSD that has its own internal controller that has a mapping table to address the NVM within the SSD. While the HDD portion of the hybrid is typically addressed directly, the hybrid controller uses a special mapping table to determine whether data is in the SSD or the HDD. The use of this special mapping table along with the internal SSD mapping table introduces duplicate overhead in cases where data is accessed in the SSD portion of the hybrid, since there are two mapping tables and there is significant cost associated with maintaining each table.

In contrast, because the controller 130 in the present architecture manages the NVM at both the block and page levels and the magnetic media, it can provide uniformed address management across the flash and magnetic media in a single location. Hence there is no need to have the two tables noted above. This has the advantages of reducing duplicative table lookups and all the associated costs/complexities related to maintaining separate mapping tables. Direct page addressing is used in the unified mapping scheme.

In addition, in a hybrid application, the NVM could still provide effective performance enhancement even when it has a large amount of bad blocks (e.g., 50%). In one hybrid embodiment, the controller also has efficient address gap handling capability (on gaps caused by the bad blocks). In an alternative hybrid embodiment, the unified addressing scheme does not necessarily require a bridge to work with the controller. The controller can potentially use a raw NVM interface (e.g., ONFI) to access the NVM.

II. DATA COMMAND PROCESSING

Figure 2:
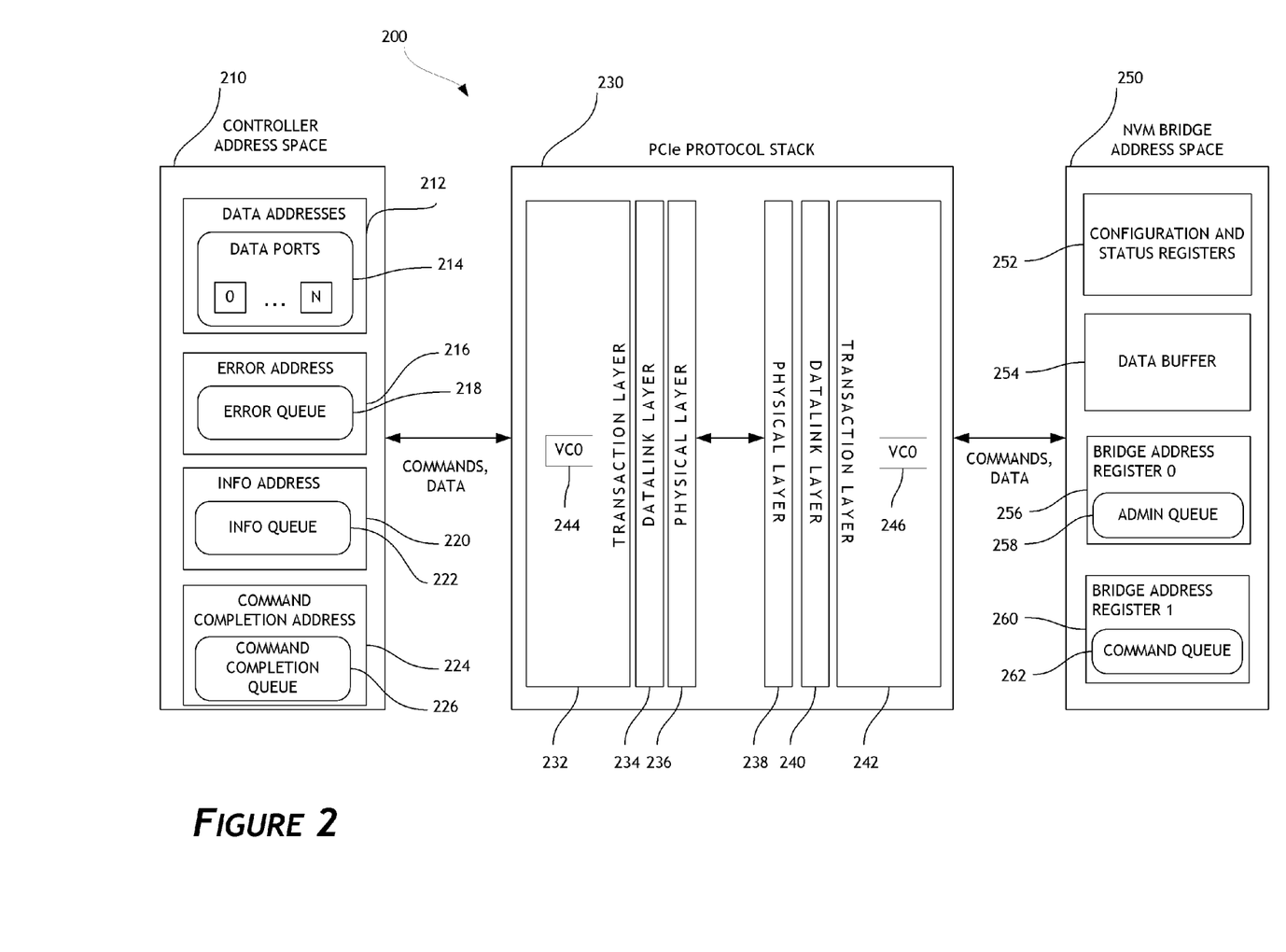
FIG. 2 is a block diagram illustrating the command processing components between the controller and the bridge device according to one embodiment.

FIG. 2 is a block diagram illustrating the command processing components between the controller and the bridge device according to one embodiment. Using the construct of the PCIe interface (or other equivalent interfaces), both the controller and the bridge implement its own address spaces (210, 250) in their respective device memories that can be addressed by the other device. Messages are communicated by writing to queues located within certain addresses within the address spaces, and the addresses are stored in the configuration and status registers 252 in one embodiment. The use of individual queues to handle data access commands and communications between the controller and the bridge will be further described below.

II.A. Command and Admin Queues—Bridge

In one embodiment, the controller sends data access commands to a command queue 262 in the bridge device. This is performed by the controller sending data command messages to the bridge (by writing to the command queue BAR (base address register)). In one embodiment, the command queue has room for sixteen messages, though the number of messages can vary in other embodiments. The command queue can be implemented in a number of ways. One option is full hardware automation where the controller simply writes to a fixed offset. Alternately it can be implemented in memory using a ring buffer or an array based linked list. In one embodiment, the implementation must allow for efficient insertion and notification with minimal bus traffic. In one embodiment, the controller knows the current queue depth based on the number of status responses the bridge has sent back (e.g., a message to the controller's completion queue indicating completion of a command). Note that the data commands are much smaller than the actual data. A given record slot in the queue is considered available once the bridge sends back a completion status or an error report.

In the embodiment shown in FIG. 2, the bridge side 250 also implements configuration and status registers (CSR) 252, along with an admin queue 258 for receiving, from the controller, command messages related to operation of the command queue (e.g., a message for pausing the command queue) or administrative messages concerning the bridge's operation in general. The admin queue 258 may be implemented in a fashion that is similar to the command queue, such as through full hardware automation or ring buffer. Also, like the command queue, the admin queue may be configured for efficient insertion and notification with minimal bus traffic. Like the command queue, the controller can derive the current queue depth and available slots based on responses from the bridge.

II.B. Status Queues—Controller

On the controller side 210 are a set of data ports 214 at data addresses 212 and a number of status queues. In one embodiment, the status queues include an error queue 218, an information queue 222, and a command completion queue 226. These queues are responsible for receiving messages from the bridge regarding command processing, as well as current status of the bridge and the NVM. In one embodiment, the controller implements three status queues to simplify command transactions. The bridge uses the completion queue 226 to indicate when it has successfully completed one or more commands. The info queue 222 is used for non-critical information such as health reports. The error queue 218 allows the bridge to send detailed reports when one or more command fails. Those skilled in the art will recognize that the three queues could be combined into fewer queues or divided into additional queues. Alternatively, in lieu of these queues, the controller and the bridge may use an interrupt based system whereby the bridge would send an interrupt when it wishes to communicate with the controller. The controller may then check a message stored on the bridge side.

II.C. Communications Between the Controller and the Bridge

Communications between the controller and the bridge are effected in one embodiment through a PCIe protocol stack 230 which includes a number of layers on both sides, including a transactional layer (232, 242), a data link layer (234, 240), and physical layer (236, 238). While PCIe is used in this disclosure to illustrate the operation of the controller and the bridge, other similar standards can be used as well.

The PCIe transaction layer assigns transmit credits based on how much room is left in its Virtual Channel (VC) buffer space. According to the PCIe specification, devices must implement VC0, though some devices implement additional VC to ensure high priority messages have dedicated resources. Packets are directed to the appropriated VC based on their Traffic Class (TC). The TC is also used to determine priority when packets are flowing over the PCIe fabric. Higher TC packets are generally given priority by the root complex, switches and end-devices.

In one embodiment, the controller is designed to operate using only VC0. In one embodiment, though the bridge may implement additional VC, it must be configurable so that it can operate in single VC mode. The messages communicated between the controller and the bridge will be better understood in view of the following brief description of the data processing flow. To service a read command from the host, the controller may first send a command message to the bridge's command queue. Once the bridge processes the command message, it will read the requested data from the NVM and send the read data back to a corresponding data port on the controller side. This action triggers the data path on the controller, which leads to the data being sent back to the host. Conversely, to service a write command from the host, the controller may first send a command message to the bridge's command queue. Once the bridge processes the command message, it will read from a corresponding data port on the controller side. This action triggers the data path on the controller, which leads to the write data being sent from a buffer in the controller to the bridge for writing to the NVM.

The controller in one embodiment communicates with the bridge using three message types of increasing priority: data to be written to the NVM for write commands (0), messages for the bridge's command queue (1), and messages for the bridge's admin queue (2). Those skilled in the art will recognize that different priorities may be assigned to these messages, and the messages could be combined into fewer types or divided into more types depending on the implementation. In one embodiment, under normal conditions, the controller sends a steady stream of data packets to the bridge.

In one embodiment, the bridge interacts with the controller using its own set of prioritized message types (listed here in increasing priority): data read from the NVM for read commands (0), messages for the controller's completion/info queues (1), and messages for the controller's error queue (2). Those skilled in the art will recognize that different priorities may be assigned to these messages, and the messages could be combined into fewer types or divided into more types depending on the implementation. As will be further described below, to facilitate fast processing of data access commands, a read or write by the bridge to a data port in the controller automatically triggers the data path in the controller. In one embodiment, it is not uncommon for the bridge to process several commands in parallel. In one embodiment, the bridge uses the completion queue 226 to notify the controller when commands have completed successfully. In additional, non-critical messages are sent to the info queue 222 while detailed error reports are sent to the error queue 218. In other embodiments, these queues may be combined into fewer queues (with different message types being distinguished by special flags or implied address values) or separated into more queues (e.g., different error queues for different types of error or different info queues for different types of information returned from the bridge).

In other embodiments where a different interface than PCIe is used, the PCIe protocol stack may be replaced with the appropriate stacks/layers of that interface. Those skilled in the art will recognized that other equivalent standardized interfaces (e.g., eMMC) may be adapted to replace PCIe. In other embodiments, a custom/proprietary interface may be used to handle communications between the controller and the bridge.

III. DETAILED ERROR REPORTING

The various detailed error reporting embodiments as applied to the above described controller-bridge architecture will be described below. Although page and pages are used in the following examples, those skilled in the art will recognize that some embodiments of the invention are applicable to report errors in other storage elements such as blocks, sectors, planes, dies, etc.

In one embodiment, the bridge supports page-level error reporting. In a simplified example, the bridge may return a message to the controller including the following: Page 1: success; Page 2: failure; Page 3: success, and so on. With this level of detail, the controller is able to know exactly where the failure occurred and can potentially recover data with around the range(s) of failure. Since failures tend to cluster, this also enables the controller to detect errors sooner compared to prior implementations that usually only report the first point of failure.

In one embodiment, the detailed error reporting enables the controller to obtain discontinuous ranges of data on reads, with "good" data being retrieved by the bridge from locations where the read was performed successfully even though some errors were encountered in locations within the range of the read operation. This can be done regardless of whether physical or logical addressing is used. This concept will be further described in FIG. 5. On writes, common implementations hide errors through indirection (i.e., program errors typically lead to attempts to re-program the same data at different physical addresses), and thus sometimes no error report is generated based on that first failure if a subsequent attempt is successful. In contrast, in some embodiments of the invention, detailed write errors are reported as well. This concept will be further described in FIG. 6. In both reads and writes, the controller is able to know exactly where the failures occurred. This supports the controller's ability to manage how the media is used at the physical page/block level. In one embodiment, detailed error reporting can be provided on erase operations as well. In addition, the detailed error reporting may be used to report errors deliberately injected by the bridge under the controller's instruction for testing purposes. These injected errors are further described in application entitled "SYSTEMS AND METHODS FOR ERROR INJECTION IN DATA STORAGE SYSTEMS," application Ser. No. 13/226,416, filed Sep. 6, 2011, the disclosure of which is hereby incorporated by reference.

In one embodiment, the report provided per command includes the command ID and tag in the error report. Commands that affect multiple pages log the actions that were taken on each page. In one embodiment, error reports are sent by the bridge to the error queue in the controller.

In one embodiment, the bridge supports at least the following ten error codes:
 a. Success—The operation was successful.
 b. Aborted—The operation was aborted.
 c. Not Executed—The operation was not executed.
 d. Invalid Address—The address is invalid due to SLC mode.
 e. Address Out of Range—The address is not in range.
 f. Page Uncorrectable—The page has an uncorrectable read error and cannot be read.
 g. Page Not Written—The controller is attempting to read a page that was not written. This assumes the bridge can differentiate the default NAND page erase state (most of the bits are set to 1) for an ECC error.
 h. Read Failed—The NAND read operation failed, no data was returned to the bridge. In some embodiments, as further described below, "bad" data or a filler data pattern may be returned to the controller.
 i. Program Failed—The NAND write operation failed, the page is not reliable.
 j. Erase Failed—The NAND block erase operation failed.

III.A Error Behaviors

In one embodiment, the bridge and the controller are configured to have the following behaviors upon encountering errors. There are external error behavior and internal error behavior. External error behavior is configured as follows in one embodiment. The controller generally sends data commands that result in some bus activity. In one embodiment, when the bridge encounters a media error while processing a regular read or write command, it is configured to stop processing the command and generate an error report. If the bridge has already triggered the data path on the controller, in one embodiment it needs to send a message (e.g., a command abort MSI interrupt) to the controller to clean up the data path in the controller. In the alternative, it could just throw the data away, though it is more efficient to tell the controller to stop. The bridge is then free to start working on the next queued command assuming no queuing restrictions have been invoked. In the alternative, the bridge can pause the queue until the controller restarts it.

Internal error behavior is configured as follows according to one embodiment. Some commands from the controller may cause internal data operations that do not result in bus transfers. In the event of an error, the bridge is configured to not send an interrupt (e.g., a MSI interrupt). Instead it is configured to stop processing the command and generate an error report. It is then free to start working on the next queued command. In both the internal and external cases, as shown in the examples below, upon encountering an error the bridge in one embodiment has the option to continue through with the command. For reads, it may attempt to return valid data around the errors.

III.B. Example Error Reporting

Figure 3:
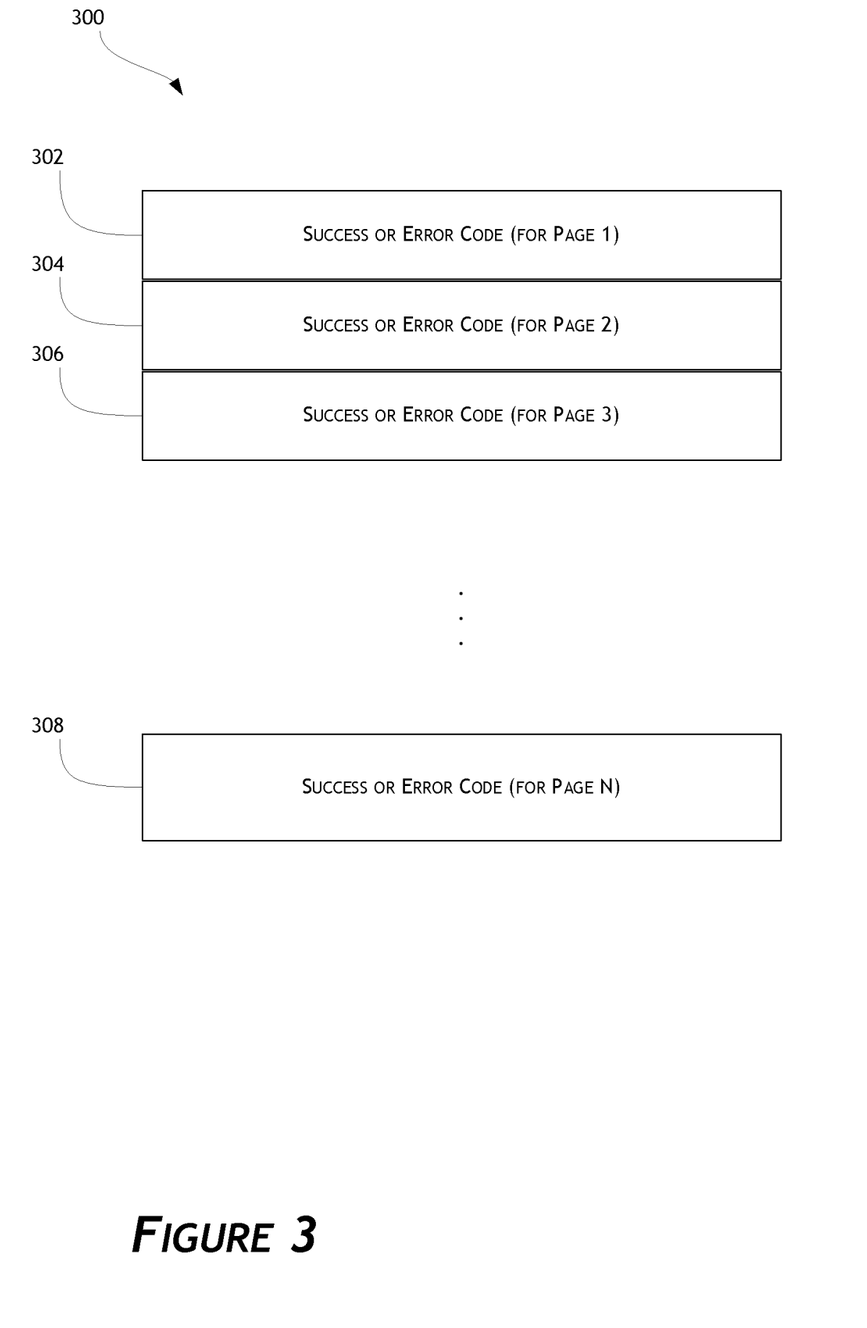
FIG. 3 is a block diagram showing an example of detailed error reporting according to one embodiment.

FIG. 3 is a block diagram showing an example 300 of detailed error reporting according to one embodiment. As shown, the bridge is configured to provide the controller detailed error reporting for various data access operations. In this example, the reporting is page-based, that is, the bridge may provide a status for each page in which the operation is performed. For example, messages 302, 304, and 306 to 308 may be returned for an operation spanning N pages. Each page is associated with a message indicating success or a message indicating a failure. In one embodiment, the messages may be implemented as a string of bits, with the position of the bit(s) correlating to the page(s) and the value of the bit(s) correlating to the status to be returned.

In one embodiment, when a data operation initiated in response to a command from the controller is completed successfully by the bridge, a completion message is returned to the controller. As described above, the completion message may be returned to the controller's completion queue in one embodiment. If any error was encountered during the operation, a message is instead sent to the controller's error queue. In one embodiment, the error message does not necessarily indicate an uncorrectable error. Rather, it may indicate correctable errors, such that those corrected by the ECC functionality within the bridge. In some situations, in addition to a completion message, an "error" message may also be sent to provide the controller non-critical information related to the operation. The information may indicate that although the operation was completed, errors were encountered and corrected at particular locations. This type of error message does not interrupt the flow of the data processing and the controller may choose to process the information at a later time.

Figure 4:
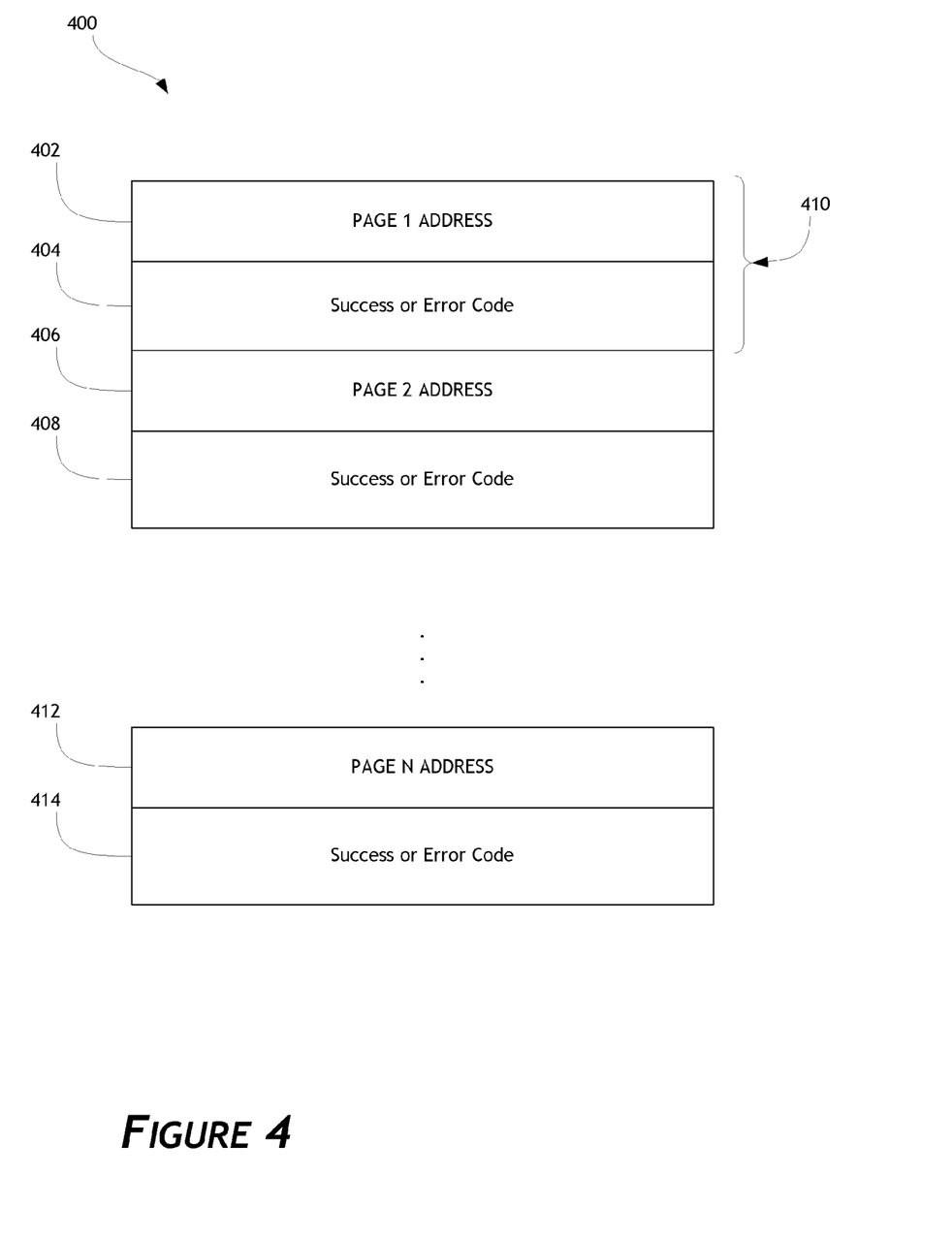
FIG. 4 is a block diagram showing another example of detailed error reporting according to another embodiment.

FIG. 4 is a block diagram showing another example 400 of detailed error reporting according to another embodiment. Similar to FIG. 3, the messages are provided by the bridge to the controller to indicate success or failure at the page level. However, unlike FIG. 3 where no header information is needed to correlate the messages to the pages, the embodiment in FIG. 4 provides explicit page header information (e.g., 402, 406, and 412). For example, a message 410 includes header information 402 to indicate the page and actual status information 404 in the form of a success or error code. As with FIG. 3, the format of the messages in FIG. 4 can be encoded in a string of bits, though those skilled in art will recognize that other formats can be used to communicate the messages shown in FIGS. 3 and 4.

III.C. Error Reporting for Reads

Figure 5:
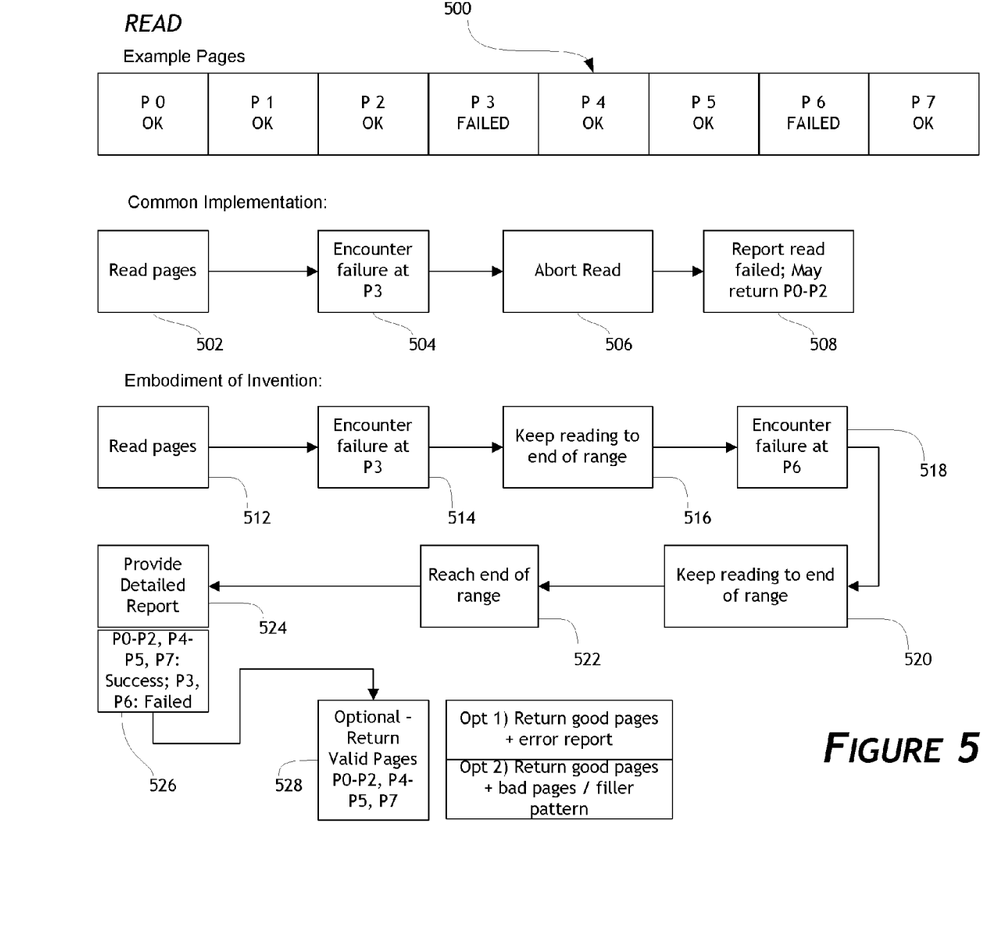
FIG. 5 is a combined block and flow diagram that illustrates the error reporting for a read operation according to one embodiment.

FIG. 5 is a combined block and flow diagram that illustrates the error reporting for a read operation according to one embodiment. FIG. 5 shows a range of page addresses 500 showing the results if a read operation were to be performed. As shown, if the eight pages (P0-P7) were read, six would be read successfully (P0-2, P4-5, and P7) and two would not be read successfully (P3 and P6).

The flow diagram of blocks 502-508 shows a common implementation. In block 502, a controller or bridge device would begin by attempting to read the pages. In block 504, it would encounter the failure at P3. Then in block 506, it would abort the read operation, and in block 508 it would report the failure of the overall read operation. In some implementations, data from P0-P2, the first successfully read pages before the failure, may be returned.

The flow diagram of blocks 512-528 illustrates the error reporting for a read according to one embodiment. In block 512, the bridge would begin to read the pages. It would encounter a failure at P3 (block 514). However, instead of aborting, the bridge would continue to read to the end of the range for the current read operation (which is P7 in this example). It would encounter a second failure at P6 (block 518), but it would again continue until the end of the range (blocks 520, 522). The bridge would then provide a detailed report about the read operation to the controller in block 524. An example report is shown in block 526. Then, optionally, the bridge would return data from pages where read was performed successfully in block 528. In one embodiment, the "good" data from the successfully read pages are returned along an error report. In another embodiment, the "good" data from the successfully read pages are returned with (1) the "bad" data from the unsuccessfully pages or (2) a filler data pattern in place of the "bad" data at the pages where the read was unsuccessful. It is noted that in some embodiments aborting at the first point of failure is an option, as discussed above. In that case, an error status message would be sent to the controller notifying that the operation was aborted. Such an error report would still be useful in many circumstances. For example, where a read operation is performed in groups of parallel sub-operations in the individual dies, when an individual sub-operation encounters an error leading to the abort, the resulting error report could still provide error/success status on the locations worked on by the individual sub-operations within the current group of parallel sub-operations when the abort signal is sent. Due to the parallel nature of the sub-operations and potential lag time between the sending of the abort signal to the actual stoppage of the sub-operations, additional errors may be reported in that current group beyond that which triggered the abort. This information may be in addition to status from locations worked on by prior groups of parallel sub-operations for this read operation, if there were any. Additional status may also be provided for those locations (e.g., pages) that were not operated on due to the abort.

III.D. Error Reporting for Writes

Figure 6:
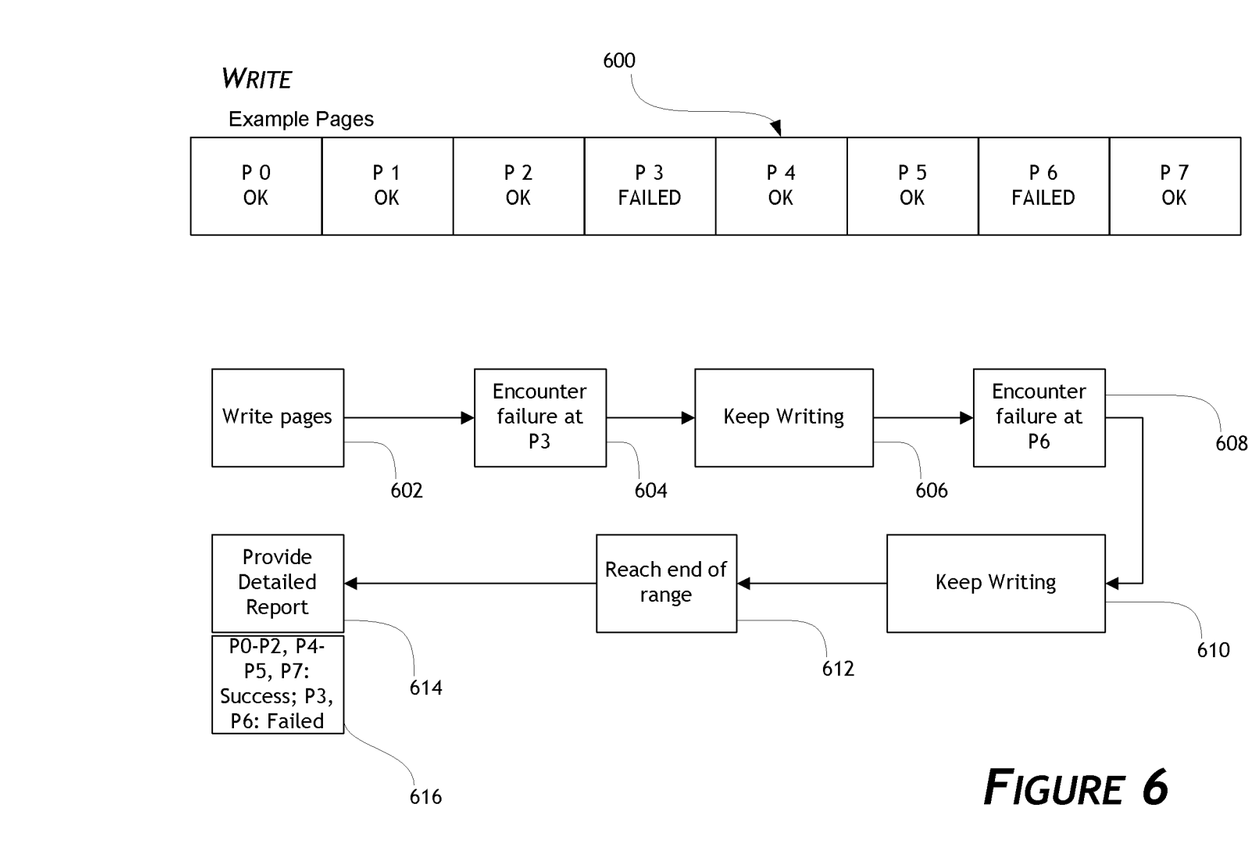
FIG. 6 is a combined block and flow diagram that illustrates the error reporting for a write operation according to one embodiment.

FIG. 6 is a combined block and flow diagram that illustrates the error reporting for a write operation according to one embodiment. FIG. 6 shows a range of page addresses 600 showing the results if a write operation were to be performed. As shown, if the eight pages (P0-P7) were written, six would be written successfully (P0-2, P4-5, and P7) and two would not be written successfully (P3 and P6).

The flow diagram of blocks 602-614 illustrates the error reporting for a write according to one embodiment. In block 602, the bridge would begin to write the pages. It would encounter a failure at P3 (block 604). However, instead of aborting, the bridge would continue to write to the end of the range for the current write operation (which is P7 in this example). It would encounter a second failure at P6 (block 608), but it would again continue until the end of the range (blocks 610, 612). The bridge would then provide a detailed report about the write operation to the controller in 614. An example report is shown in block 616. It is noted that in some embodiments aborting at the first point of failure is an option, as discussed above. In that case, an error status message would be sent to the controller notifying that the operation was aborted. The discussion above regarding the groups of parallel sub-operations also applies here, and the report may include error/success indications for the various locations worked on by the parallel sub-operations.

IV. ALTERNATIVE EMBODIMENTS; CONCLUSION

As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of some embodiments of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices (e.g., dies) may be physically divided into planes, blocks, pages, and sectors, as is known in the art. Other forms of storage (e.g., battery backed-up volatile DRAM or SRAM devices, magnetic disk drives, etc.) may additionally or alternatively be used.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, the various components illustrated in FIGS. 1A, 1B, and 2 may be implemented as software and/or firmware on a processor, ASIC/FPGA, or dedicated hardware. For example, those skilled in the art will appreciate that in some embodiments, the actual steps taken in the processes shown in FIGS. 5 and 6 may differ from those shown in the figures. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for reporting errors in a data storage system comprising a controller device and a bridge device coupled with a non-volatile memory storage, the method comprising:
   causing execution of a memory access operation spanning a plurality of memory elements in the non-volatile memory storage, wherein execution of the memory access operation comprises: upon encountering a failure in a memory element, continuing executing the memory access operation on one or more memory elements following the memory element where the failure has been encountered until the memory access operation is completed; and
   receiving an error report comprising, for each memory element on which the memory access operation has been executed, a status of executing the memory access operation on the memory element, wherein the error report comprises a status of executing the memory access operation on at least one memory element subsequent to the memory element where the failure has been encountered,
   wherein the method is performed by the controller device.

2. The method of claim 1, wherein the status of executing the memory access operation on a memory element comprises an indication of whether the operation performed on the memory element was a success or failure.

3. The method of claim 1, wherein the memory access operation is a read operation and the method further comprises receiving data stored in one or more memory elements where the read operation was successfully executed in the event of encountering the failure.

4. The method of claim 1, wherein each of the memory elements comprises a page.

5. The method of claim 1, wherein each of the memory elements comprises a block.

6. The method of claim 1, wherein the controller device is provided page level access to the non-volatile memory storage through the bridge device, and wherein the controller device and the bridge device communicate via an interface.

7. The method of claim 6, wherein the interface is PCIe.

8. The method of claim 1, wherein the error report further comprises data relating to a type of failure encountered.

9. The method of claim 1, wherein the failure is an uncorrectable error.

10. A data storage system comprising:
    a controller device coupled with a non-volatile memory storage via a bridge device, the controller device configured to:
       transmit to the bridge device a command comprising a memory access operation spanning a plurality of memory elements in the non-volatile memory storage, wherein the transmission of the command causes execution of the memory access operation, and wherein execution of the memory access operation comprises: upon encountering a failure in a memory element, continuing execution of the memory access operation on at least one memory element following the memory element where the failure has been encountered until the memory access operation is completed; and
       receive an error report comprising, for each memory element on which the memory access operation has been performed, a status of executing the memory access operation on the memory element, wherein the error report comprises status for the memory access operation on at least one memory element subsequent to the memory element where the failure has been encountered.

11. The data storage system of claim 10, wherein the status of executing the memory access operation on a memory element comprises an indication of whether the memory access operation performed on the memory element was a success or failure.

12. The data storage system of claim 10, wherein the memory access operation is a read operation, and wherein the controller device is further configured to receive data stored in one or more memory elements where the read operation was successfully performed in the event of encountering the failure.

13. The data storage system of claim 10, wherein each of the memory elements comprises a page.

14. The data storage system of claim 10, wherein each of the memory elements comprises a block.

15. The data storage system of claim 10, wherein the error report further comprises data relating to a type of failure encountered.

16. The data storage system of claim 10, wherein the controller device is configured to communicate with the bridge device over a PCIe interface.

17. The data storage system of claim 10, wherein the bridge device is configured to communicate with the non-volatile memory over an ONFI interface.

18. The data storage system of claim 10, wherein the non-volatile memory storage comprises non-volatile solid-state memory.

19. A data storage system comprising:
    a controller device configured to:
       cause execution of a memory access operation spanning a plurality of memory elements in a non-volatile memory storage, wherein execution of the memory access operation comprises executing in parallel one or more groups of sub-operations, and wherein execution of the operation further comprises: upon encountering a failure in one of the memory elements, initiating a stoppage of each of the one or more groups of sub-operations; and receive an error report comprising, for each memory element on which the memory access operation has been performed at the time when the stoppage occurred, a status of executing the memory access operation on a memory element, wherein the report comprises status for a memory element operated on by at least one sub-operation other than the sub-operation for which the failure has been encountered.

20. The data storage system of claim 19, wherein the status of executing the memory access operation on a memory element comprises an indication of whether the memory access operation performed on the element was a success or failure.

21. The data storage system of claim 19, wherein the controller is coupled to the non-volatile memory storage via a bridge device.

22. The data storage system of claim 19, wherein the error report comprises status for at least one memory element not operated on due to the stoppage of the memory access operation.

\* \* \* \* \*